United States Patent
Shalev et al.

(10) Patent No.: US 11,184,388 B2
(45) Date of Patent: Nov. 23, 2021

(54) CRYPTIC VEHICLE SHIELD

(71) Applicant: Argus Cyber Security Ltd., Tel Aviv (IL)

(72) Inventors: Amos Shalev, Tel Aviv (IL); Yaron Galula, Kadima (IL)

(73) Assignee: Argus Cyber Security Ltd., Tel Aviv (IL)

( * ) Notice: Subject to any disclaimer, the term of this patent is extended or adjusted under 35 U.S.C. 154(b) by 240 days.

(21) Appl. No.: 16/278,775

(22) Filed: Feb. 19, 2019

(65) Prior Publication Data

US 2019/0260800 A1 Aug. 22, 2019

Related U.S. Application Data

(60) Provisional application No. 62/631,970, filed on Feb. 19, 2018.

(51) Int. Cl.
| | |
|---|---|
| *H04L 29/06* | (2006.01) |
| *H04L 9/00* | (2006.01) |
| *H04L 29/08* | (2006.01) |
| *G06F 21/55* | (2013.01) |

(52) U.S. Cl.
CPC ........ *H04L 63/1466* (2013.01); *G06F 21/552* (2013.01); *G06F 21/554* (2013.01); *H04L 9/002* (2013.01); *H04L 63/0414* (2013.01); *H04L 63/0428* (2013.01); *H04L 63/0823* (2013.01); *H04L 63/1416* (2013.01); *H04L 67/12* (2013.01); *H04L 67/325* (2013.01); *H04L 2209/08* (2013.01); *H04L 2209/84* (2013.01)

(58) Field of Classification Search
CPC ............. H04L 63/1466; H04L 63/1441; H04L 63/1433; H04L 9/002; G06F 21/55; G06F 21/552; G06F 21/554
See application file for complete search history.

(56) References Cited

U.S. PATENT DOCUMENTS

| | | | |
|---|---|---|---|
| 9,160,539 B1* | 10/2015 | Juels | G06F 21/554 |
| 9,747,455 B1 | 8/2017 | McClintock et al. | |
| 10,298,612 B2* | 5/2019 | Galula | B60R 16/0232 |
| 2004/0049693 A1* | 3/2004 | Douglas | G06F 21/552 |
| | | | 726/23 |
| 2006/0064486 A1* | 3/2006 | Baron | H04L 41/5019 |
| | | | 709/224 |
| 2007/0168532 A1* | 7/2007 | Sheymov | G06F 21/554 |
| | | | 709/229 |
| 2008/0256624 A1* | 10/2008 | Sheymov | H04L 63/0236 |
| | | | 726/14 |
| 2010/0263049 A1 | 10/2010 | Cross et al. | |

(Continued)

OTHER PUBLICATIONS

European Search Report dated Jul. 9, 2019 for European Application No. 19157991.1 filed Feb. 19, 2019.

(Continued)

*Primary Examiner* — Esther B. Henderson
(74) *Attorney, Agent, or Firm* — A.C. Entis-IP Ltd.; Allan C. Entis (57) ABSTRACT

A method of providing an alert of an occurrence of a hacker intrusion, the method comprising: detecting a hacker intrusion; and transmitting a concealed or camouflaged report of the hacker intrusion to provide an alert of the occurrence of the intrusion.

18 Claims, 5 Drawing Sheets

(56) References Cited

U.S. PATENT DOCUMENTS

2015/0172306 A1* 6/2015 Kim .................... H04L 12/4625
                                                          726/23
2017/0155679 A1* 6/2017 Choi .................... G06F 3/0623

OTHER PUBLICATIONS

Kevin D Bowers et al., Securing the Data in Big Data Security Analytics, vol. 20130929: 175300, Sep. 27, 2013, pp. 1-14.
Reza Sadoddin et al., Alert Correlation Survey: Framework and Techniques, Oct. 30, 2006, pp. 1-10.
European Examination Report dated Jul. 8, 2020 for European Application No. 19157991.1 filed Feb. 19, 2019.

* cited by examiner

CRYPTIC VEHICLE SHIELD

RELATED APPLICATIONS

The present application claims benefit under 35 U.S. C. 119(e) of U.S. Provisional Application 62/631,970 filed Feb. 19, 2018, the disclosure of which is incorporated herein by reference.

FIELD

Embodiments of the disclosure relate to protecting a computing/communications device and/or a system, such as a communications network that may comprise a computing/communications device, from compromise by a cyber attacker.

BACKGROUND

Modern vehicles, whether aircraft, sea craft, or automotive are typically "drive by wire" (DbW) vehicles in which electrical and/or electromechanical components exchange digital signals over a wired and/or wireless in-vehicle communications network to cooperate in operating and controlling the vehicles, and interfacing users with the vehicles. The components have largely replaced mechanical linkages traditionally used to operate and interface users with vehicles, and have provided the vehicles with a resolution of vehicle control and an expanding menu of functionalities and services that were impossible or impractical to implement, or even to conceive of in the past.

By way of example, a modern automotive vehicle may for example be home to as many as a hundred or more electronic control units (ECUs) that communicate via the in-vehicle network with each other and with sensors and actuators that monitor and control vehicle functions to operate the vehicle and interface the vehicle with a user. The ECU's may, by way of example, be used to control the vehicle engine, power steering, transmission, antilock braking (ABS), airbag deployment, cruise control, power windows, doors, and mirror adjustment. In addition, an in-vehicle network typically supports on board diagnostic (OBD) systems and communication ports, various vehicle status warning systems, such as engine temperature and TPMS (tire pressure monitor system), collision avoidance systems, keyless entry, audio and visual information and entertainment (infotainment) systems, and/or processing of images acquired by on-board camera systems. The in-vehicle network in general also provides access to mobile communications networks, Bluetooth, and/or WiFi, interfaces, vehicle to vehicle (V2V) and vehicle to infrastructure (V2I), communications, the Internet, and/or GPS (global positioning system).

Various communications protocols have been developed to configure, manage, and control communications of vehicle components that are connected to and communicate over an in-vehicle communications network. Popular in-vehicle network communications protocols currently available are CAN (control area network), FlexRay, MOST (Media Oriented Systems Transport), Ethernet, and LIN (local interconnect network). The protocols may define a communications bus and how the ECUs, sensors, and actuators, generically referred to as nodes, connected to the communication bus, access and use the bus to transmit signals to each other.

The growing multiplicity of electronic control systems, sensors, actuators, ECUs and communications interfaces and ports that an in-vehicle communications network supports makes the in-vehicle communications network, and the individual vehicle components that communicate via the communications network, increasingly vulnerable to cyber-attacks that may compromise vehicle safety and performance. In response to the recognized vulnerability of in-vehicle communications networks to cyber-attack, various intrusion detection and prevention systems (IDPS) have been configured to protect vehicle communications networks and/or nodes thereof against cyber attackers, also, optionally, referred to as "hackers". As common in dynamic attack and counterattack environments, cyber attackers have adopted tactics to thwart operation of IDPSs.

It is noted that, the revolutions that automotive communications systems and component nodes have undergone and are continuously undergoing, and the concomitant hacking vulnerabilities and dangers discussed above to which the revolutions expose the systems are not limited to automotive communications systems. The revolutions and dangers are representative of what systems of related appliances and devices are undergoing as they abandon direct human supervision and control of their functionalities and acquire components that enable them to join and communicate among themselves via the internet of things (IOT) to cooperate in fulfilling their tasks.

SUMMARY

An aspect of an embodiment of the disclosure relates to providing an intrusion detection and prevention system, hereinafter also referred to as an IDPS configured to protect itself and an in-vehicle communications network and/or individual component thereof, that the IDPS protects from reconnaissance activity undertaken by a cyber attacker that is intended to acquire data with respect to features of the IDPS, the communications network, and/or a component of the network, which may be useable to compromise protection that the IDPS provides. Protection that an IDPS in accordance with an embodiment of the disclosure provides, may be based on network-based intrusion detection and/or host-based intrusion detection. Network-based intrusion detection comprises collecting and analyzing data from messages propagating in a network to detect anomalies that may be indicative of hacker intrusion. Host-based intrusion detection comprises collecting and analyzing data relevant to the internal processes of a particular host, such as a node of the network, to detect anomalies in the internal functioning of the host, which may be indicative of hacker intrusion into the host. Such anomalies may for example include anomalies in operation of the host operating system, central processor, memory, and/or anomalies in system calls. In an embodiment, the IDPS, hereinafter also referred to as a stealth IDPS, hereinafter also referred to as S-IDPS, is configured to exhibit cryptic behavior—"crypsis"—intended to conceal and/or camouflage features of its performance that may be used by a cyber attacker to compromise the S-IDPS, the in-vehicle network, and/or a network node that the S-IDPS protects.

In an embodiment, cryptic behavior may comprise camouflaging and/or concealing responses of the S-IDPS to attempts by a hacker to access and/or disrupt operation of the in-vehicle network. In an embodiment, a S-IDPS comprises at least one module, optionally referred to as a stealth-Watchman, hereinafter also referred to as S-Watchman, configured to monitor at least a portion of the in-vehicle network that the S-IDPS protects to identify anomalies in the communication traffic that may indicate a hacker intrusion or attempt at intrusion, generically a "hacker intrusion", into the network. The at least one S-Watchman operates to camouflage and/or conceal responses that the S-Watchman generates in response to identifying a hacker intrusion and/or a hacker intrusion that another component of the in-vehicle network may identify.

An S-Watchman in accordance with an embodiment of the disclosure, may employ crypsis to protect messages, hereinafter also referred to as "hacking report messages", comprising "hacking data" relevant to a hacker intrusion, which S-Watchman transmits for processing and/or storage to an external, optionally cloud based, hub. Crypsis may comprise concealing the hacking report message by delaying its transmission and/or embedding at least some of the hacking data comprised in the hacking report message as data transmitted to the hub in a message that is not a hacking report message, or transmitting the hacking report message as a message among a sequence of messages that are not related to hacking. Crypsis may comprise camouflaging a hacking report message as a message in a message format used for messages that are not related to hacking events or as a message unrelated to a hacking attempt. Cryptic behavior by a S-Watchman in accordance with an embodiment may comprise selecting, optionally randomly, different cryptic procedures from a library of cryptic procedures, to hide responses of the S-Watchman from detection by a hacker. In an embodiment a S-Watchman may determine a context for the vehicle, the in-vehicle communications network in which it is installed, and/or an a node of the network, and adopt and configure cryptic behavior responsive to the determined context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale FIG. 1A schematically shows a vehicle comprising, optionally a CAN, in-vehicle communications network having a S-IDPS comprising a S-Watchmen transmitting a hacking message to a cloud based hub, in accordance with an embodiment of the disclosure.

DETAILED DESCRIPTION

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1A:
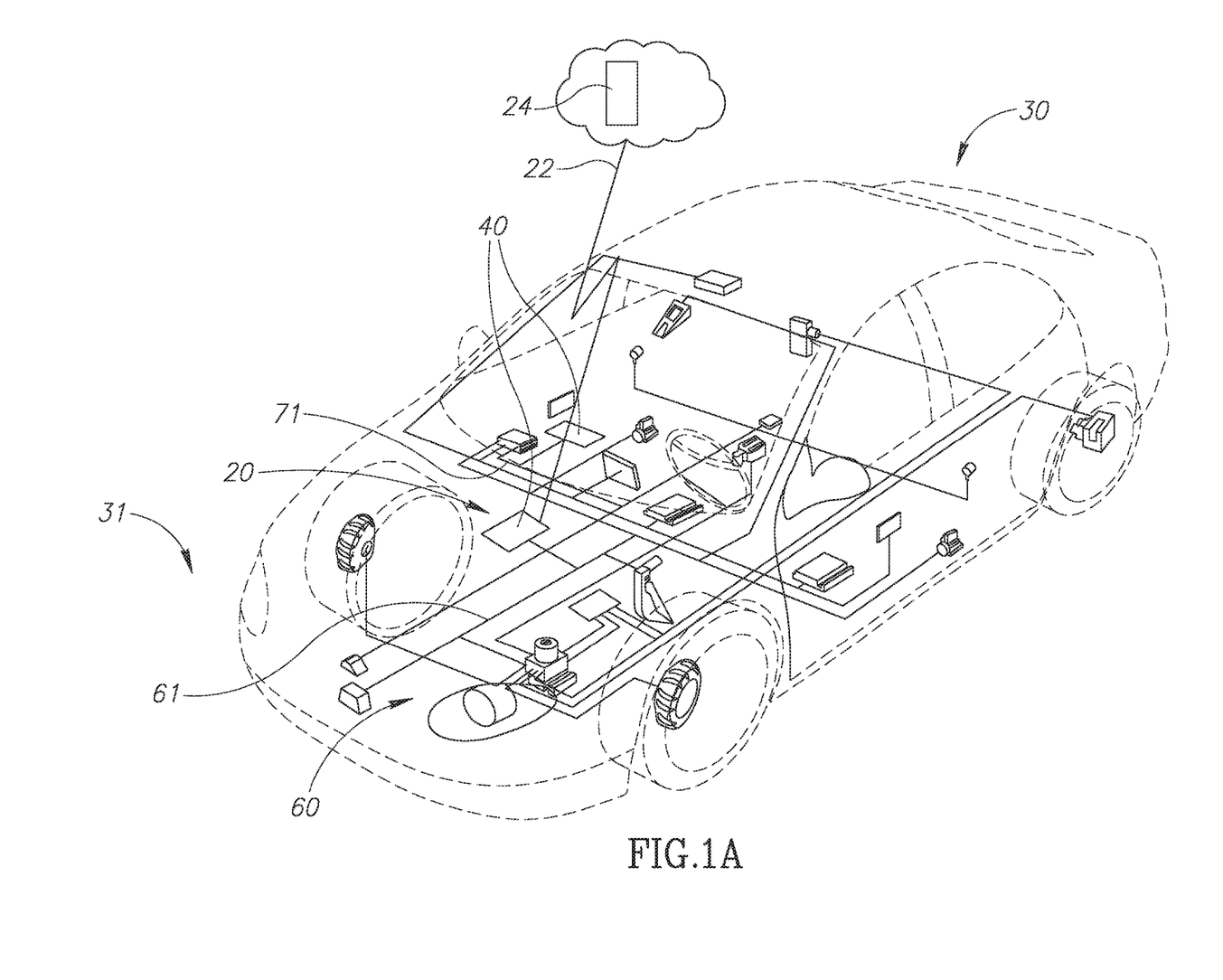

FIG. 1A schematically shows a vehicle 30 comprising an in-vehicle, optionally a CAN communications network 60, having an IDPS 20 comprising at least one S-Watchman 40, of which only one is shown in FIG. 1A, installed to monitor and protect a portion of the network, in accordance with an embodiment of the disclosure. In the figure S-Watchman 40 is schematically show transmitting a report message, optionally a hacking report message, represented by a lightening arrow 22 to a cloud based Cyber-Hub 24.

In-vehicle communications network 60 optionally comprises a high-speed CAN bus 61 and a medium-speed CAN bus 71. A plurality of components of vehicle 30, such as various ECUs, sensors, and communications devices, are connected to the buses as nodes. The nodes connected to buses 61 and 71 communicate with each other by transmitting and receiving CAN frames, which may be referred to as CAN packets, or CAN messages, via the buses. S-Watchman 40, in accordance with an embodiment of the disclosure, is optionally connected to high-speed CAN bus 61. Nodes in vehicle 30 that are connected to in-vehicle network 60 may generically be labeled and referred to by a numeral 160, and in FIG. 1A nodes from a selection of nodes connected to in-vehicle communications network 60 are generically indicated by the numeral 160.

Figure 1B:
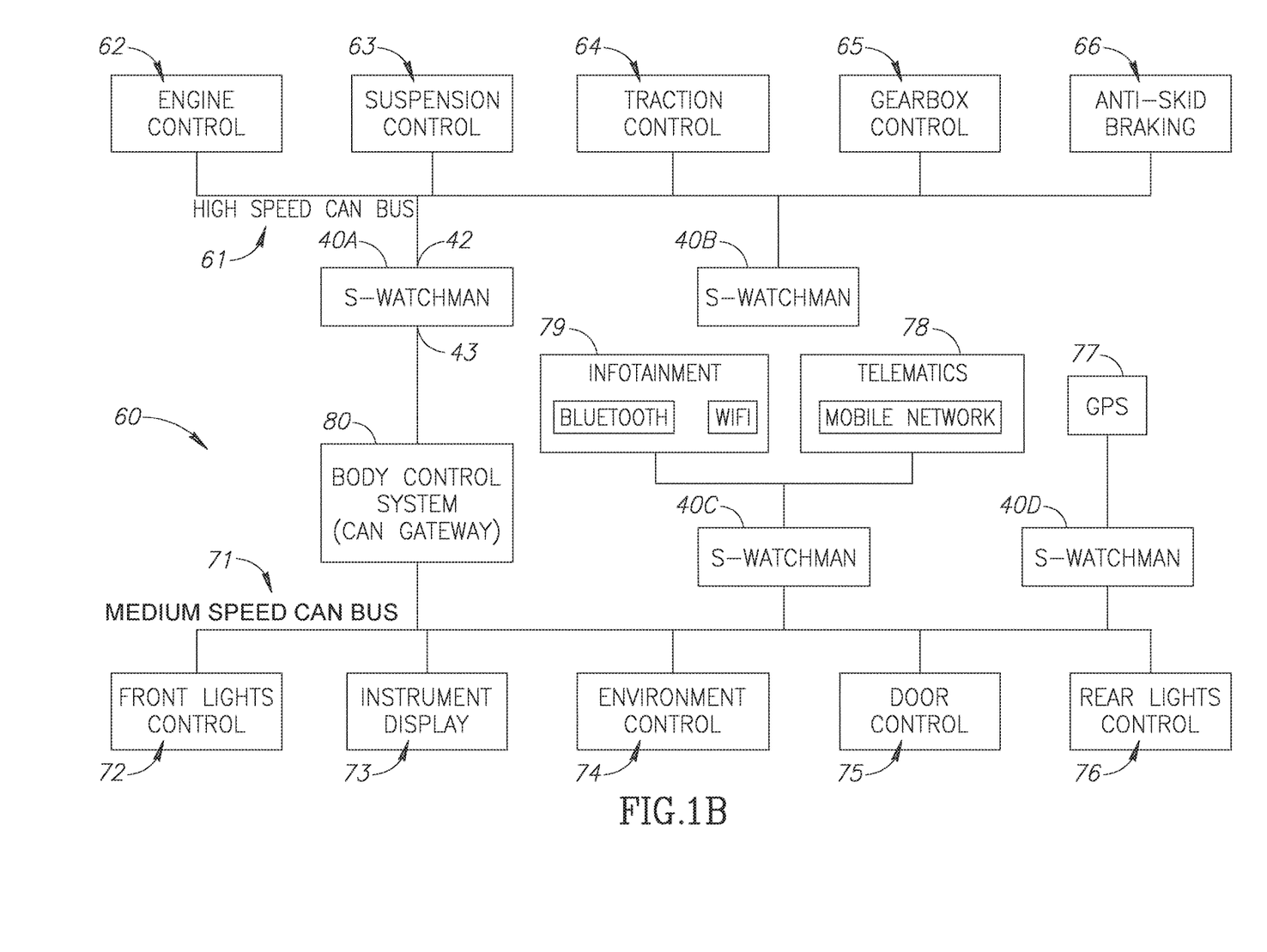
FIG. 1B shows a schematic block diagram of a portion of an in-vehicle CAN communications network protected by the S-IDPS, in accordance with an embodiment of the disclosure.

FIG. 1B shows a schematic block diagram of a portion of in-vehicle communication network 60 showing S-IDPS 20 having a plurality of S-Watchmen 40 that protect the network and specific control systems as may be comprised in a subscriber vehicle 30. The control systems and/or their respective components are connected to high-speed and medium-speed bus bars 61 and 71. Medium-speed CAN bus 71 may be a class B CAN bus that operates at data transmission speeds of up to 125 kilobits per second (Kbps), to support communications between nodes, such as components of vehicle body control systems and infotainment systems that can function properly receiving and transmitting data at relatively low data transmission rates. By way of example, medium-speed CAN bus 71 is schematically shown connected to nodes that are headlight, instrument display, environment control, door control, and rear light systems 72, 73, 74, 75, and 76 respectively. An infotainment system 79 comprising Bluetooth and Wifi communication interfaces and a Telematics system 78 that provides a communication interface to mobile phone networks and supports hands free calling are connected to medium-speed CAN bus 71 via a S-Watchman discussed below. A GPS receiver 77 is optionally separate from Telematics system 78, and is connected to medium-speed CAN bus 71. High-speed CAN bus 61 may be a class C CAN bus that operates at data transmission speeds of up to 1 megabits per second to support communications between nodes such as sensors and ECUs of various control systems that may require relatively high-speed transmission of data between the nodes to operate properly. High-speed CAN bus 61 is schematically shown connected to engine, suspension, traction, gearbox, and braking control systems 62, 63, 64, 65, and 66 respectively. High-speed CAN bus 61 is connected by a body control system gateway 80 to medium-speed CAN bus 71.

S-IDP 20 has, in accordance with an embodiment, a configuration of a plurality of, optionally four, S-Watchman 40, individualized by labels 40A, 40B, 40C, and 40D. S-Watchmen connected to network 60 are referenced generically by the numerical reference 40 and by the individualized labels 40A, 40B, 40C and 40D with respect to features associated with a particular S-Watchman S-Watchman 40A is optionally a two communication port module connected between high-speed bus 61 and gateway 80 that connects the high-speed bus to medium-speed bus 71. S-Watchman 40B is optionally a single communication port module connected to high-speed bus 61. Infotainment system 79 and Telematics system 78 are connected via S-Watchman 40C, to medium-speed bus 71 and GPS receiver 77 is optionally connected via S-Watchman 40D to medium-speed bus 71. S-Watchman 40A operates in accordance with an embodiment of the disclosure to monitor CAN messages that are transmitted between high-speed bus 61 and gateway 80 and to respond to anomalous communications to protect communications between the CAN bus and the gateway. S-Watchman 40B is connected to high-speed CAN bus 61 to eavesdrop on communications over the high-speed bus and protect communications propagated over the bus. S-Watchman 40C and 40D operate to protect medium-speed CAN bus 71 from Cyber-attacks that attempt to enter in-vehicle communication system 60 via its Bluetooth, WiFi, and mobile telephone communication interfaces. S-Watchmen in accordance with an embodiment of the disclosure are not limited to a number of communication ports shown in FIG. 1A and may have a number of communication ports different from the numbers shown in FIG. 1A.

Whereas in FIGS. 1A and 1B S-Watchmen 40 are schematically shown as separate components that appear to be hardware components, a S-Watchman in accordance with an embodiment of the disclosure may be a "virtualized S-Watchman" defined by software, which is defined as including computer executable instructions and/or data comprised in a node of in-vehicle communication network 60. For example, gateway 80 may comprise software—computer executable instructions and/or data—or a combination of software and hardware that support S-Watchman functionalities in accordance with an embodiment of the disclosure that may be provided by S-Watchman 40A, shown separate from the gateway in FIG. 1B. Or an ECM (not shown) in engine control system 62 may comprise computer executable instructions and data that provide S-Watchman functionalities in accordance with an embodiment of the disclosure that may be provided by S-Watchman 40A, S-Watchman 40B, or functionalities that operate to provide host-based intrusion detection for internal operation of the ECM. A S-Watchman may also be integrated to the hardware of a node, such as telematics unit 78, of in-vehicle communication network 60, between the CAN transceiver and the CAN controller of the node.

Figure 2:
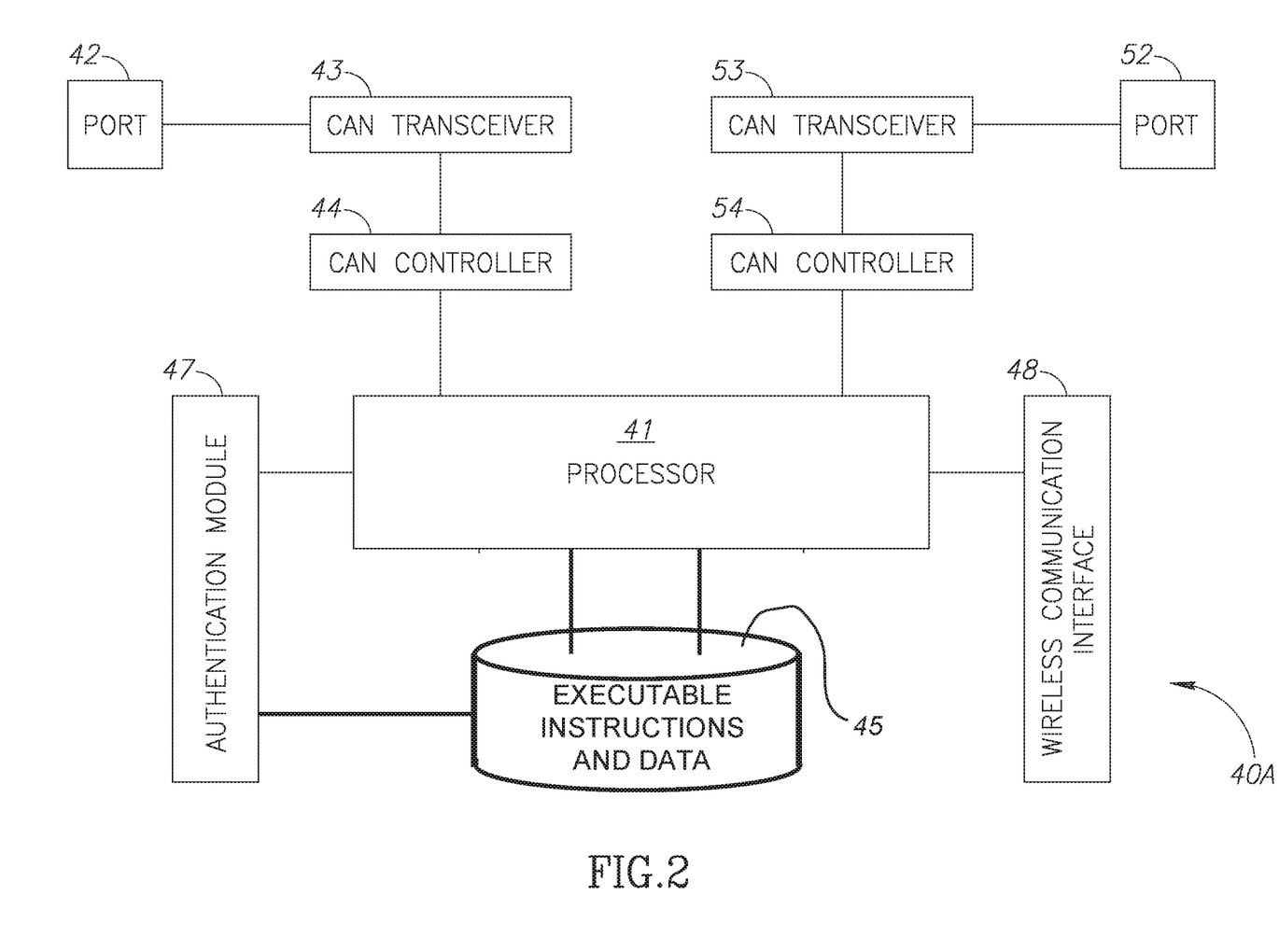
FIG. 2 shows a schematic block diagram of an S-Watchman, in accordance with an embodiment of the disclosure.

FIG. 2A schematically shows components of a S-Watchman 40, for example S-Watchman that support operation of the S-Watchman in identifying and reporting data in anomalous messages in accordance with an embodiment of the disclosure.

S-Watchman 40A optionally comprises a processor 41 and optionally two communication ports 42 and 52 for transmitting messages to and receiving messages from a CAN bus or a CAN node to which the S-Watchman is connected. For example, in FIG. 1B communication port 42 of S-Watchman 40A is connected to high-speed bus 61 and port 52 of the S-Watchman is connected to CAN gateway 80. Port 42 is connected to processor 41 by a CAN transceiver 43 and a CAN controller 44. Transceiver 43 converts bits in a CAN message, which are serially received from high-speed bus 61 at port 42, from a CAN format to a format used by S-Watchman 40A and forwards the bits to CAN controller 44. The CAN controller stores the bits until all the bits in the CAN message to which the bits belong are received, and the complete message is assembled. CAN controller 44 forwards the assembled message to processor 41 for processing in accordance with an embodiment of the disclosure. CAN controller 44 also receives bits generated by processor 41 for transmission from S-Watchman 40A to high-speed CAN bus 61 in a CAN message, and forwards the bits to transceiver 43 for conversion from a S-Watchman format in which the bits are generated to a CAN format. Transceiver 43 forwards the bits in the CAN format for transmission to CAN bus 61 via port 42. Similarly to port 42, port 52 is connected to processor 41 by a transceiver 53 and controller 54 and operates for transmitting CAN messages to and from CAN gateway 80.

S-Watchman 40A optionally comprises a wireless communication interface 48 for communicating with Cyber-Hub 24, authorized users, drivers of subscriber vehicles, and other external entities via a wireless communication channel and optionally an authentication module 47 for authenticating messages the S-Watchman receives. Wireless interface 48 may provide connectivity to a WiFi, and/or a Bluetooth channel and/or a mobile phone network such as a 3G network. In the absence of such a wireless capability, a S-Watchman in accordance with an embodiment of the disclosure may communicate with Cyber-Hub 24 over an existing vehicle connection to the cloud. This may be performed by tunneling via a CAN bus, such as CAN bus 71 or 61 to an ECU in the in-vehicle network 60 that may have connectivity to the cloud. The tunnel may be implemented by reading and writing PIDs according to the Unified Diagnostic System Standard or by using any other protocol supported by the CAN bus.

Authentication module 47 may comprise computer executable instructions for authenticating a message that S-Watchman receives using any of various authentication algorithms. Authentication algorithms that may be used by authentication module 47 may comprise for example, any of various asymmetric key encryption algorithms, a combination of asymmetric and symmetric key encryption algorithms, and may include authentication algorithms such as TLS (Transport Layer security), and PGP (Pretty Good Privacy). Optionally authentication module 47 is or comprises a hardware security module (HSM) for authenticating received messages. In an embodiment, authentication may be implemented so that it will not be susceptible to a "Reply Attack", for example by including a timestamp in authenticated data. In cases where no secure timestamp information exists in S-Watchman 40A, the S-Watchman may initialize a clock it comprises randomly and securely send a "pseudo timestamp" to Cyber-Hub 24 which in turn may use the pseudo timestamp in further communications with the Cyber-Hub.

Processor 41 processes a message that S-Watchman 40A receives via port 42 or port 52 in accordance with computer executable instructions and/or data comprised in software, optionally stored in a memory 45. The software may be configured for determining if a received message, optionally in accordance with a vehicle context, an in-vehicle communications network context, and/or an internal node context relevant to the received message, is anomalous and indicative of a hacking intrusion. A context may be determined by S-Watchman 40A responsive to data comprised in messages that S-Watchman 40A receives and optionally uses to define a context feature vector, which the S-Watchman may store as data in a memory 45. In an embodiment the software comprises executable instructions for configuring and transmitting hacking report messages responsive to determining that a message is anomalous to Cyber-hub 24 and applying cryptic algorithms to protect the transmissions, in accordance with an embodiment of the disclosure.

Figure 3A:
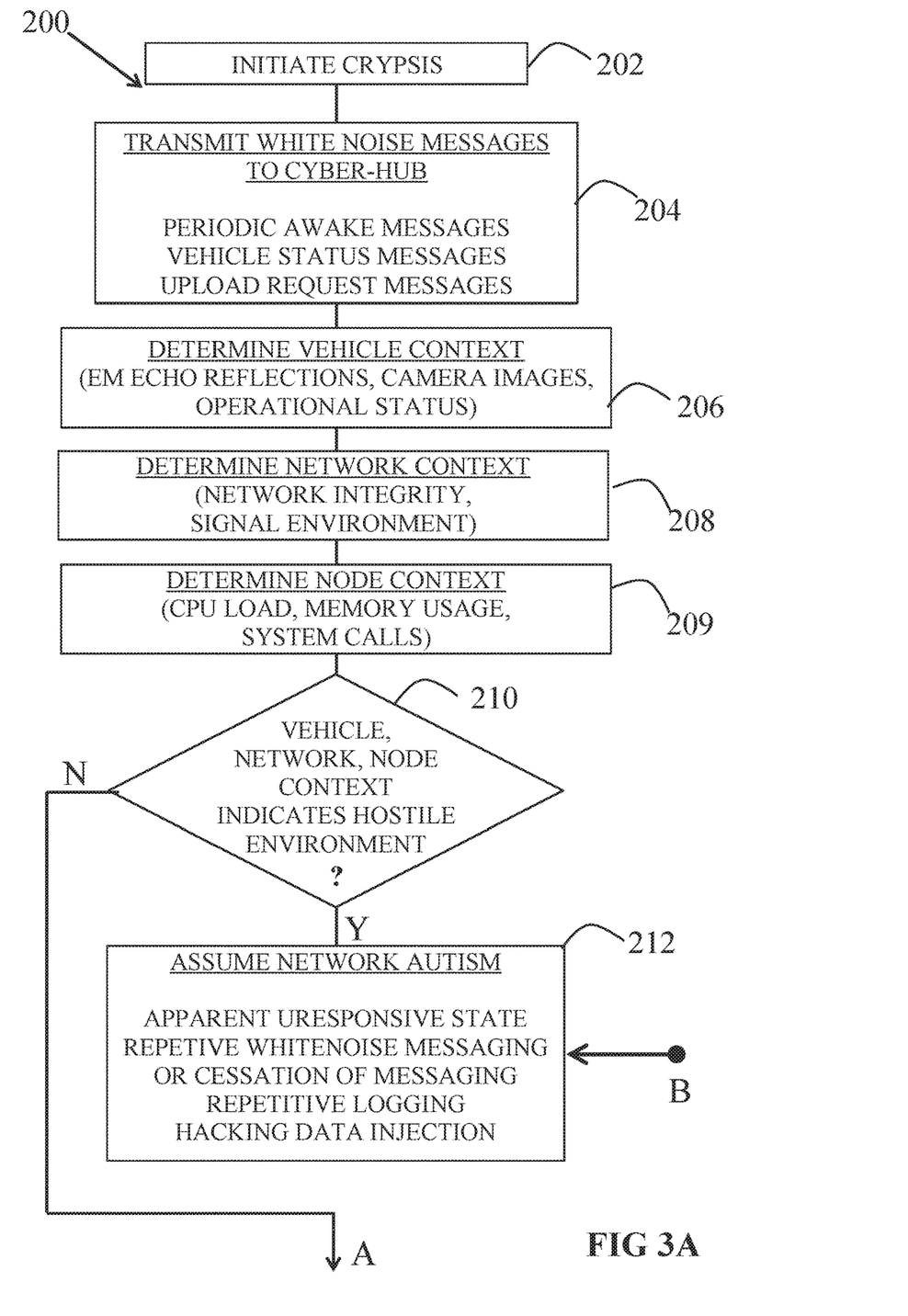
FIGS. 3A and 3B shows a flow diagram of a cryptic algorithm that an S-Watchman, comprised in the S-IDPS shown in FIGS. 1A and 1B may employ to protect an in-vehicle communications network and S-IDPS from reconnaissance activity undertaken by a cyber attacker, in accordance with an embodiment of the disclosure.
Figure 3B:
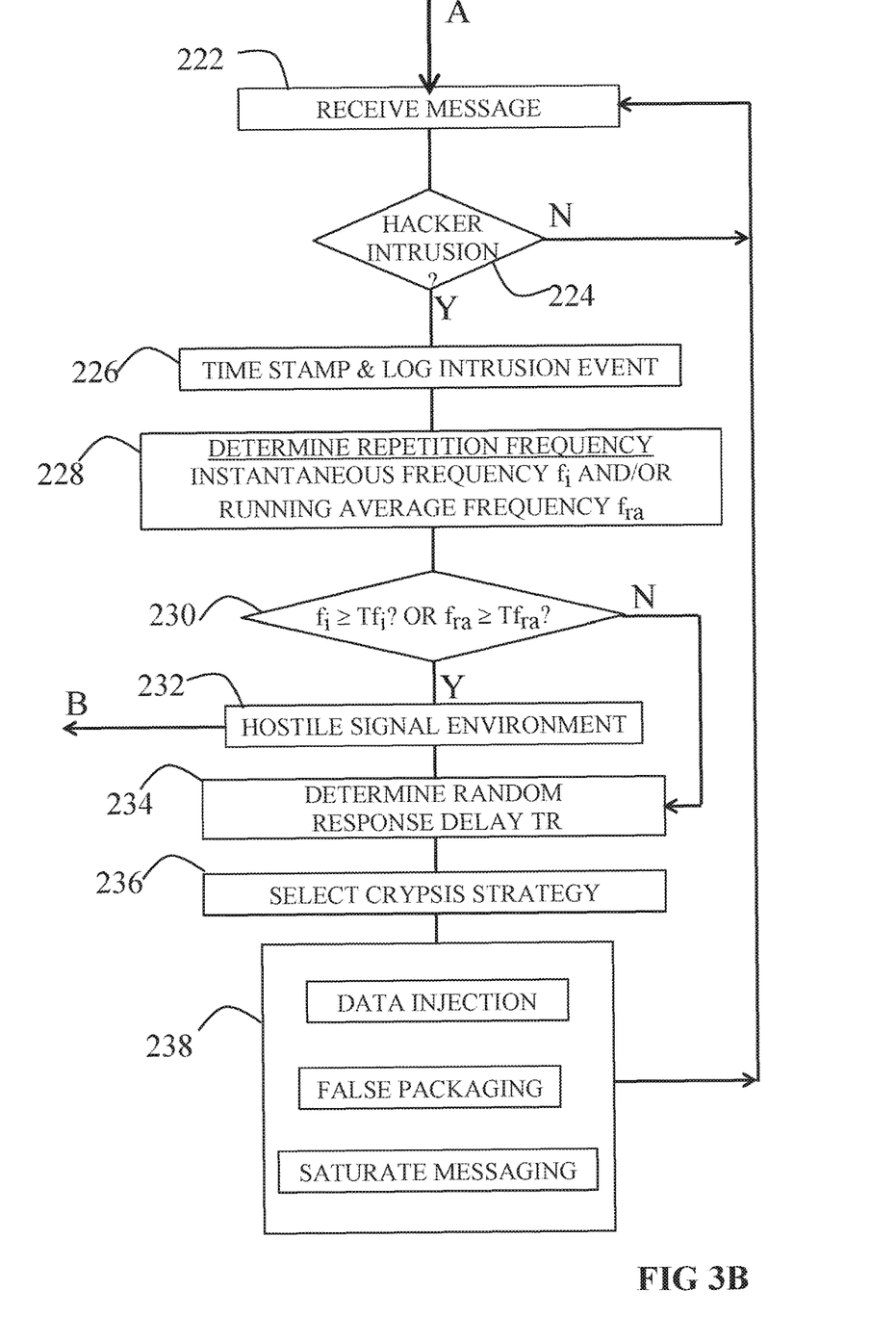

FIG. 3 shows a flow diagram 200 of a cryptic procedure that an S-Watchman 40 may process messages in an in-vehicle communications network, such as network 60, when the S-Watchman operates in a crypsis mode in accordance with an embodiment of the disclosure.

In a block 202 S-Watchman 40 may initiate operations in a cryptic mode, and in a block 204 generates background, "white noise" messaging in which it communicates regularly with cyber-hub 24 (FIG. 1A) to exchange messages characteristic of normal communications between the S-Watchman and the cyber-hub. White noise messaging may include transmitting periodic awake messages to cyber-hub 24 to keep the cyber-hub cognizant that S-Watchman 40 is available to communicate with the cyber-hub, transmitting and receiving requests for vehicle status messages, and/or transmitting messages requesting permission to upload data to the cyber-hub.

In a block 206 S-Watchman 40 optionally operates to determine a vehicle context that may be used to indicate whether the vehicle is operating in a "hostile environment" in which it is exposed to a hacker attempt to determine how to breach IDPS 20 and in-vehicle network 60. The context may comprise data useable to determine if the vehicle is located in a hacker "safe" research zone, such as a garage or otherwise secure and/or isolated area, in which a hacker may operate in security to acquire data with respect to features of S-Watchman 40 and/or IDPS 20 that may be useable to compromise protection that the IDPS provides in-vehicle network 60. For example, to determine if the vehicle is in a hacker safe garage, S-Watchman 40 may transmit communications signals and operate to receive and process electromagnetic (EM) reflections from the transmitted signals that the S-Watchman may be configured to process to determine if the vehicle is in a closed area. The S-Watchman may be configured to operate a camera installed in the vehicle to acquire images of the vehicle's surroundings and process the images to determine an immediate environment of the vehicle, and if the environment may be considered a hacker safe zone. The S-Watchman may operate to receive data provided by sensors in the vehicle useable to determine an operating status of the vehicle that may indicate that the vehicle is being operated in a hacker safe zone. Data that may be used to determine the operating status may comprise status of doors and window, battery power drainage, vehicle speed, and engine status. For example, an operating status of a vehicle indicating that a door and/or window of the vehicle is open for an extended period of time while the vehicle is stationary and the engine running to provide energy for powering a particular level of battery drainage may indicate the vehicle is undergoing illicit hacker testing.

Optionally, in a block 208 Watchman 40 may operate to determine a network context that characterizes an operating environment of in-vehicle network 60 and S-IDPS 20 and whether the operating environment is hostile. A network context optionally comprises an integrity status that indicates whether components of network 60 and/or S-IDPS 20 are operating properly or if some components have been damaged or disabled. For example, a hacker may disable a wireless communication interface comprised in in-vehicle network 60 and/or IDPS 20 to prevent S-watchman from alerting cyber-hub 24 that the hacker is probing the network to determine how to breach the network.

The network context in accordance with an embodiment may comprise a profile of a message or signal environment in which network 60 and S-IDPS 20 operate, which may be used to indicate whether the network is operating in a hostile signal environment. The profile may comprise a frequency of anomalous signals that components of the network are exposed to for use in determining whether the network is operating in a hostile environment. Initially upon initiating cryptic operation, signal data may be sparse and a signal profile premature and not advantageous for determining whether or not the signal environment in which S-IDPS 20 and network 60 operate is hostile. Subsequent to initiation of crypsis in block 202, acquisition of signal data useable for determining signal environment may be accomplished optionally in performance of actions indicated by blocks 222-232 described below.

The signal environment profile may comprise features of communications between S-WATCHMAN 40 and cyber-hub 24 (FIG. 1A) that characterize the communications and may be used to determine whether the S-WATCHMAN is operating in a hostile environment. For example, in an embodiment S-WATCHMAN 40 may operate to transmit to and/or receive data from cyber-hub 24 only after successfully completing a suitable handshake procedure in which the cyber-hub identity is verified and/or the cyber-hub indicated as available for communications with the S-WATCHMAN. Verification may be dependent on S-WATCHMAN 40 receiving a properly encoded signal, for example a digitally signed ack signal, from cyber-hub 24 (FIG. 1A) which may be decoded by the S-WATCHMAN to authenticate identity of the hub. In the absence of the ack signal S-WATCHMAN 40 may determine that it is operating in a hostile signal environment.

In a block 209 S-WATCHMAN 40 may operate to determine an internal context of a node connected to in-vehicle network 60. The node may be a node in which S-WATCHMAN 40 is hosted and/or a node with which S-Watchman communicates. An internal context of a node may by way of example comprise CPU load, memory usage, and/or rate and type of systems calls that an executing program in the node makes.

In a decision block 210 S-Watchman 40 optionally determines whether the vehicle, network and/or internal context determined in block 206-209 indicate that in-vehicle network 60 is operating in a hostile environment. If the IS-Watchman determines that the environment is hostile, S-Watchman 40 may assume a network autism mode of operation. In the autism mode S-Watchman operates to appear unresponsive to attempts to intrude network 60 and optionally continues white noise communications with cyber-hub 24 characteristic of normal, unthreatened operation of the IS-Watchman and S-IDPS 20 or shuts down communications with the cyber-hub. S-Watchman may continue logging data relevant to the hacking intrusions and during white noise communications transmit portions of the logged data to cyber-hub 24 by concealing the portions of the logged data in white noise messages that the S-Watchman transmits to the cyber-hub.

On the other hand if in decision block 210 S-Watchman 40 determines that the contexts determined in block 206 and 208 do not indicate a hostile environment the S-Watchman may proceed to a block 222. In block 222 the S-Watchman receives a message from a portion of in-vehicle network 60 that the S-Watchman monitors and in a decision block 224 determines whether or not the message is anomalous. If the message is determined not to be anomalous S-Watchman 40 returns to block 222 to receive another message from in-vehicle network 60.

If in decision block S-Watchman 40 determines that the message is an attempt of a hacker to intrude network 60, in a block 226 the S-Watchman time stamps and logs data relevant to the hacking attempt in memory 45. Optionally, in a block 228 S-Watchman 40 determines an instantaneous frequency, of occurrence and a running average frequency, $f_{ra}$, of occurrence for anomalous messages that the S-Watchman receives. Optionally the instantaneous frequency, for a given received anomalous message is equal to an inverse of a time lapse between a time at which the given anomalous message is received and a time at which a last previous anomalous message is received. Optionally, the running average frequency, $f_{ra}$, is equal to an inverse of an average of time lapses between times of reception of sequential anomalous messages during a limited period of time immediately preceding time of reception of the given message. In an embodiment, the limited period of time is equal to or less than 24 hours. In a decision block 230 S-Watchman 40 determines whether $f_i$ is greater than a predetermined threshold $Tf_i$ or $f_{ra}$ is greater than a predetermined threshold $Tf_{ra}$ and if either $f_i$ or $f_{ra}$ is greater than its associated threshold $Tf_i$ or $Tf_{ra}$, S-Watchman 40 optionally proceeds to a block 232. In block 232 the S-Watchman determines that in-vehicle network 60 is operating in a hostile environment and returns to block 212 to assume the network autism mode of operation.

If on the other hand, in decision block 230 neither of thresholds $Tf_i$ or $Tf_{ra}$ is exceeded, S-Watchman 40 optionally proceeds to a block 234 and determines a random response time delay TR. Following TR, optionally in a block 236, the S-Watchman selects a crypsis strategy from a menu of messaging formats in a block 238 to use to transmit data, hacking data, relevant to characterizing the given anomalous message to cyber-hub 24. In "data injection", portions of the hacking data are hidden in messages that are transmitted to cyber-hub 24 during normal operation of in-vehicle network 60 and are not associated with reporting hacking incidents. In false packaging the data is packaged in a message format that is not associated with reporting anomalous messages. In saturated messaging S-Watchman 40 transmits the data to cyber-hub 24 in a relatively small number of hacking report messages dispersed among a relatively large number of innocuous messages. Following, transmission of the data S-Watchman 40 may return to block 222 to receive another message from the portion of in-vehicle network that the S-Watchman monitors.

It is noted that whereas the above discussion describes an S-IDPS and S-Watchman as functioning to provide cyber-security to an in-vehicle communications network and/or specific nodes thereof, practice of embodiments of the disclosure are not limited to automotive networks and automotive components. An S-IDPS and/or S-Watchman, in accordance with an embodiment of the disclosure, whether comprising hardware, software, and/or virtualized components, or any combination of more than one thereof, may operate to provide cyber-protection against hackers to any computing device that can be a target of hacker attack. A computing device may be any device that processes data to provide a desired functionality and may be any device which is or can be configured to communicate with other devices over the internet of things. For example, a computing device may be a refrigerator, a "good-cyber-fridge", which monitors its contents to provision a user with foods suitable for maintaining the user at a desired body mass index (BMI).

There is therefore provided in accordance with an embodiment of the disclosure a method of providing an alert of an occurrence of a hacker intrusion, the method comprising: detecting a hacker intrusion; and transmitting a concealed or camouflaged report of the hacker intrusion to provide an alert of the occurrence of the intrusion. Optionally, transmitting a concealed or camouflaged report comprises engaging in a habitual pattern of message transmission and concealing or camouflaging the report in the habitual pattern of transmission. Optionally, the habitual pattern of message transmission comprises transmitting messages in a normal message format that is used for transmitting information in an absence of a hacker intrusion and transmitting the report in the normal message format.

Additionally or alternatively, the habitual pattern of message transmission comprises transmitting messages in accordance with a normal temporal pattern of transmission that is used for transmitting information in an absence of an attempt at a hacker intrusion and transmitting the report at times that accord with the normal temporal pattern of transmission. Optionally, transmitting the report so that it does not appear temporally related to a time at which an attempt at a hacker intrusion occurs. Optionally, transmitting the report so that it does not appear temporally related comprises determining a random response time delay and transmitting the report at a time based on the determined random time delay. Optionally the method comprises determining the random response time in response to detecting the hacker intrusion.

In an embodiment concealing or camouflaging the report comprises transmitting portions of the report hidden in messages that are not associated with reporting a hacking intrusion. Optionally, transmitting the report hidden in messages comprises transmitting portions of the report in a relatively small number of hacking report messages dispersed among a relatively large number of messages that do not comprise a portion of the report.

In an embodiment concealing or camouflaging the report comprises combining a salt with report data related to the hacker intrusion, encrypting the combination of the report data and the salt, and transmitting the encrypted data to provide the alert.

In an embodiment transmitting a concealed or camouflaged report of the hacker intrusion is dependent upon determining whether a target of the hacker intrusion is located in an environment which is hostile. Optionally, if the target is determined to be located in a hostile environment not transmitting the report while the target is in the hostile environment. Additionally or alternatively, determining if the target of the hacker intrusion is located in a hostile operating environment may comprise attempting a communications handshake with an intended recipient of the alert, and if the handshake fails determining that the environment is a hostile environment. Optionally, attempting a handshake comprises authenticating a digital certificate presented by the recipient.

In an embodiment determining if the target of the hacker intrusion is located in a hostile operating environment comprises determining at least one frequency of occurrence of anomalous signals associated with a target of the hacker intrusion and determining whether or not the environment is hostile based on the at least one frequency. Optionally, determining whether or not the environment is hostile comprises determining if the frequency is greater than a predetermined threshold. Additionally or alternatively, the at least one frequency may comprise an instantaneous frequency. Additionally or alternatively, the at least one frequency may comprise a running frequency.

In an embodiment the target is an in-vehicle communications network and/or a component thereof.

There is further provided in accordance with an embodiment of the disclosure an intrusion detection system (IDS) for providing a computing device with protection against intrusion by a hacker the IDS comprising: at least one memory having software comprising data characterizing normal operation of the device and the IDS, and instructions executable to conceal or camouflage a response of the module or device to a hacker intrusion in accordance with any of claims 1-19; at least one connection to the computing device which the IDS is configured to use to receive signals useable to monitor operations of the device and/or communications to and from the device; at least one communications interface via which the IDS is configured to transmit to and/or receive signals from an entity external to the device; and a processor configured to use the software to process signals received by the module to detect and generate an alert to a hacker intrusion.

Optionally, the computing device comprises at least one device that is a component of a communications network. Optionally, the communications network comprises an in-vehicle communications network. Optionally, the at least one connection comprises a connection to a bus of the in-vehicle communications system. Additionally or alternatively, the at least one connection may comprise a connection to a node of the in-vehicle communications network via which the IDS receives signals responsive to the internal operations of the node. In an embodiment the at least one connection comprises a hook in an operating system of the node.

In an embodiment the module is configured to receive image data responsive to images that a camera in the vehicle generates and process the image data to determine if an environment in which the vehicle is located is hostile.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A method of providing an alert of an occurrence of a hacker intrusion, the method comprising:
   detecting a hacker intrusion; and
   transmitting a concealed or camouflaged report of the hacker intrusion to provide an alert of the occurrence of the intrusion,
   wherein the transmitting of the concealed or camouflaged report of the hacker intrusion is dependent upon determining whether a target of the hacker intrusion is located in a hostile environment in which the target is exposed to a hacker attempt to determine how to breach the target, and not transmitting the report while the target is in the hostile environment.

2. The method according to claim 1, wherein transmitting a concealed or camouflaged report comprises engaging in a habitual pattern of message transmission and concealing or camouflaging the report in the habitual pattern of transmission.

3. The method according to claim 2, wherein the habitual pattern of message transmission comprises transmitting messages in a normal message format that is used for transmitting information in an absence of a hacker intrusion and transmitting the report in the normal message format.

4. The method according to claim 2, wherein the habitual pattern of message transmission comprises transmitting messages in accordance with a normal temporal pattern of transmission that is used for transmitting information in an absence of an attempt at a hacker intrusion and transmitting the report at times that accord with the normal temporal pattern of transmission.

5. The method according to claim 4, wherein transmitting the report so that it does not appear temporally related to a time at which an attempt at a hacker intrusion occurs.

6. The method according to claim 5, wherein transmitting the report so that it does not appear temporally related comprises determining a random response time delay and transmitting the report at a time based on the determined random time delay.

7. The method according to claim 6, and comprising determining the random response time in response to detecting the hacker intrusion.

8. The method according to claim 1, wherein concealing or camouflaging the report comprises transmitting portions of the report hidden in messages that are not associated with reporting a hacking intrusion.

9. The method according to claim 1, wherein concealing or camouflaging the report comprises combining a salt with report data related to the hacker intrusion, encrypting the combination of the report data and the salt, and transmitting the encrypted data to provide the alert.

10. The method according to claim 1, wherein determining if the target of the hacker intrusion is located in a hostile operating environment comprises attempting a communications handshake with an intended recipient of the alert, and if the handshake fails determining that the environment is a hostile environment.

11. The method according to claim 10, wherein attempting a handshake comprises authenticating a digital certificate presented by the recipient.

12. The method according to claim 1, wherein determining if the target of the hacker intrusion is located in a hostile operating environment comprises determining at least one frequency of occurrence of anomalous signals associated with a target of the hacker intrusion and determining whether or not the environment is hostile based on the at least one frequency.

13. The method according to claim 12, wherein determining whether or not the environment is hostile comprises determining if the frequency is greater than a predetermined threshold.

14. The method according to claim 12, wherein the at least one frequency comprises an instantaneous frequency.

15. The method according to claim 12, wherein the at least one frequency comprises a running average frequency.

16. An intrusion detection system for providing a computing device with protection against intrusion by a hacker, the intrusion detection system comprising:
   at least one memory having software comprising a set of instructions and data characterizing normal operation of the device and the intrusion detection system;
   at least one connection to the computing device which the intrusion detection system is configured to use to receive signals useable to monitor operations of the computing device and/or communications to and from the computing device;
   at least one communications interface via which the intrusion detection system is configured to transmit to and/or receive signals from an entity external to the computing device; and
   a processor configured to, based on the set of instruction and the data, to process signals received by the computing device to:
   detect a hacker intrusion; and
   transmit a concealed or camouflaged report of the hacker intrusion to provide an alert of the occurrence of the intrusion,
   wherein the transmitting of the concealed or camouflaged report of the hacker intrusion is dependent upon determining whether a target of the hacker intrusion is located in a hostile environment, in which the target is exposed to a hacker attempt to determine how to breach the target, and not transmitting the report while the target is in the hostile environment.

17. The intrusion detection system in accordance with claim 16, wherein the computing device comprises at least one device that is a component of a communications network.

18. The intrusion detection system in accordance with claim 17, wherein the communications network comprises an in-vehicle communications network.

* * * * *